US009742804B2

(12) United States Patent
Urias et al.

(10) Patent No.: US 9,742,804 B2
(45) Date of Patent: Aug. 22, 2017

(54) COMPUTER NETWORK DEFENSE SYSTEM

(71) Applicant: National Technology & Engineering Solutions of Sandia, LLC, Albuquerque, NM (US)

(72) Inventors: Vincent Urias, Albuquerque, NM (US); William M. S. Stout, Alburquerque, NM (US); Caleb Loverro, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 21 days.

(21) Appl. No.: 14/925,645

(22) Filed: Oct. 28, 2015

(65) Prior Publication Data
US 2017/0126736 A1    May 4, 2017

(51) Int. Cl.
*H04L 29/06*    (2006.01)
*G06F 9/455*    (2006.01)

(52) U.S. Cl.
CPC ...... *H04L 63/1491* (2013.01); *G06F 9/45558* (2013.01); *H04L 63/1425* (2013.01); *G06F 2009/45587* (2013.01)

(58) Field of Classification Search
None
See application file for complete search history.

(56) References Cited

U.S. PATENT DOCUMENTS

| 9,495,188 | B1* | 11/2016 | Ettema | G06F 9/45533 |
| 2008/0016570 | A1* | 1/2008 | Capalik | H04L 63/1408 726/23 |
| 2008/0235769 | A1* | 9/2008 | Purcell | H04L 63/1416 726/3 |
| 2009/0204964 | A1* | 8/2009 | Foley | G06F 21/53 718/1 |

(Continued)

OTHER PUBLICATIONS

Mandiant, "APT1: Exposing One of China's Cyber Espionage Units", Mandiant, Oct. 23, 2004, 76 pages, accessed Jul. 27, 2015. http://intelreport.mandiant.com/Mandiant_APT1_Report.pdf.

(Continued)

*Primary Examiner* — Kambiz Zand
*Assistant Examiner* — Arezoo Sherkat
(74) *Attorney, Agent, or Firm* — Yee & Associates PC

(57) ABSTRACT

A method and apparatus for protecting virtual machines. A computer system creates a copy of a group of the virtual machines in an operating network in a deception network to form a group of cloned virtual machines in the deception network when the group of the virtual machines is accessed by an adversary. The computer system creates an emulation of components from the operating network in the deception network. The components are accessible by the group of the cloned virtual machines as if the group of the cloned virtual machines was in the operating network. The computer system moves network connections for the group of the virtual machines in the operating network used by the adversary from the group of the virtual machines in the (Continued)

operating network to the group of the cloned virtual machines, enabling protecting the group of the virtual machines from actions performed by the adversary.

25 Claims, 9 Drawing Sheets

(56) References Cited

U.S. PATENT DOCUMENTS

| | | | | |
|---|---|---|---|---|
| 2011/0321165 A1* | 12/2011 | Capalik | ............... | G06F 11/3471 726/25 |
| 2011/0321166 A1* | 12/2011 | Capalik | ............... | H04L 63/1491 726/25 |
| 2016/0080415 A1* | 3/2016 | Wu | ..................... | H04L 63/1491 726/23 |
| 2016/0149950 A1* | 5/2016 | Ashley | ................ | H04L 63/1491 726/23 |

OTHER PUBLICATIONS

Alese et al., "Improving Deception in Honeynet", 9th International Conference for Internet Technology and Secured Transactions, Dec. 2014, pp. 198-204.

Virvilis et al., "Changing the game: The art of deceiving sophisticated attackers", 6th International Conference on Cyber Conflict, Jun. 2014, pp. 87-97.

Shadow Networks, "Advanced Threat Deception", Shadow Networks, copyright 2014, 2 pages, accessed Jul. 27, 2015. http://www.shadownetworks.com/wp-content/uploads/Shadow-Networks_Bro_Final.pdf.

* cited by examiner

COMPUTER NETWORK DEFENSE SYSTEM

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer network and, in particular, to a method and apparatus for a computer network defense system. Still more particularly, the present disclosure relates to a method and apparatus for using deception to protect a computer network.

2. Background

Many organizations employ computer networks in day-to-day activities. These activities include activities such as payroll, human resources, research, sales, marketing, and other suitable activities. These types of activities often include connectivity of internal computer networks to the outside world through the Internet.

More often, organizations are attacked and compromised by adversaries. The adversaries may steal information about customers, transactions, research, or other confidential or sensitive information. In other cases, adversaries may take actions that cause the organization to be unable to perform at a desired level.

In protecting computer networks from adversaries, various tools are currently present for use by organizations. These tools include signature-based detectors, whitelisting, blacklisting, intrusion detection and protection systems, and other suitable types of tools.

Actions that may be taken using these types of tools include, for example, unplugging compromised hosts, quarantining compromised hosts, and other suitable actions. These types of actions, however, are reactionary and do not provide an ability to obtain insight into the actions taken by an adversary attacking computer network. This type of information is often useful in mitigating the effects of a current attack or protecting against future attacks on a computer network.

One solution involves the use of honeypots. A honeypot is a trap that is used to detect, deflect, or in some other manner counteract the attempts at unauthorized use of a computer network. With a honeypot, a portion of the network system may be isolated from the rest of the network. The honeypot may contain information or resources that may be desirable to an adversary. This honeypot may monitor or obtain information about the actions performed by an adversary.

However, the use of honeypots has not been effective, particularly when honeypots can be detected. Honeypots often do not provide a sufficiently realistic environment in which the adversary will perform actions to show its capabilities.

Thus, despite the expenditure of significant amounts of money and effort, computer networks are not as secure against attacks from adversaries as desired. Further, attacks from adversaries are becoming more aggressive and widespread. Therefore, it would be desirable to have a method and apparatus that take into account at least some of the issues discussed above, as well as other possible issues. For example, it would be desirable to have a method and apparatus that overcome the technical problem with obtaining information about an adversary to mitigate the current attack or prevent future attacks on a computer network.

SUMMARY

An embodiment of the present disclosure provides a method for protecting virtual machines. A computer system creates a copy of a group of the virtual machines in an operating network in a deception network to form a group of cloned virtual machines in the deception network when the group of the virtual machines in the operating network is accessed by an adversary. The computer system then creates an emulation of components from the operating network in the deception network. The components are accessible by the group of the cloned virtual machines as if the group of the cloned virtual machines was in the operating network. The computer system moves a group of network connections for the group of the virtual machines in the operating network used by the adversary from the group of the virtual machines in the operating network to the group of the cloned virtual machines in the deception network, enabling protecting the group of the virtual machines from actions performed by the adversary.

Another embodiment of the present disclosure provides an apparatus comprising a threat manager in a computer system. The threat manager creates a copy of a group of virtual machines in an operating network in a deception network to form a group of cloned virtual machines in the deception network when the group of the virtual machines in the operating network is accessed by an adversary. The threat manager creates an emulation of components from the operating network in the deception network. The components are accessible by the group of the cloned virtual machines as if the group of the cloned virtual machines was in the operating network. The threat manager also moves a group of network connections for the group of the virtual machines in the operating network used by the adversary from the group of the virtual machines in the operating network to the group of the cloned virtual machines in the deception network, enabling protecting the group of the virtual machines from actions performed by the adversary.

Yet another embodiment of the present disclosure provides a computer program product for protecting virtual machines comprising a computer readable storage media, and first program code, second program code, and third program code stored on the computer readable storage media. The first program code creates a copy of a group of the virtual machines in an operating network in a deception network to form a group of cloned virtual machines in the deception network when the group of the virtual machines in the operating network is accessed by an adversary. The second program code creates an emulation of components from the operating network in the deception network. The components are accessible by the group of the cloned virtual machines as if the group of the cloned virtual machines was in the operating network. The third program code moves a group of network connections for the group of the virtual machines in the operating network used by the adversary from the group of the virtual machines in the operating network to the group of the cloned virtual machines in the deception network, enabling protecting the group of the virtual machines from actions performed by the adversary.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current tools counteracting intrusions into computer networks are either reactionary or do not provide sufficient deception to cause an adversary to perform sufficient actions to gain insight into the adversary.

The illustrative embodiments recognize and take into account that computing environments such as those involving cloud computing and software defined networks (SDNs) are being used more often. For example, the illustrative embodiments recognize and take into account that organizations such as businesses are moving towards virtualized environments using software defined networks (SDN) for day-to-day operations.

In an illustrative example, cloud computing involves providing computer services, such as application and information storage in multiple redundant locations that are accessible on the Internet by client devices. A software defined network is a network in which the control of the network is decoupled from the hardware. For example, the controller, making decisions about where traffic is sent, is separated from the hardware that performs the forwarding of traffic.

The illustrative embodiments recognize and take into account that adversaries typically expect the presence of a homogeneous environment with virtualized networks. The illustrative embodiments recognize and take into account that this expectation may be used to create a deception network that is capable of reducing the impact of actions taken by an adversary.

Figure 1:
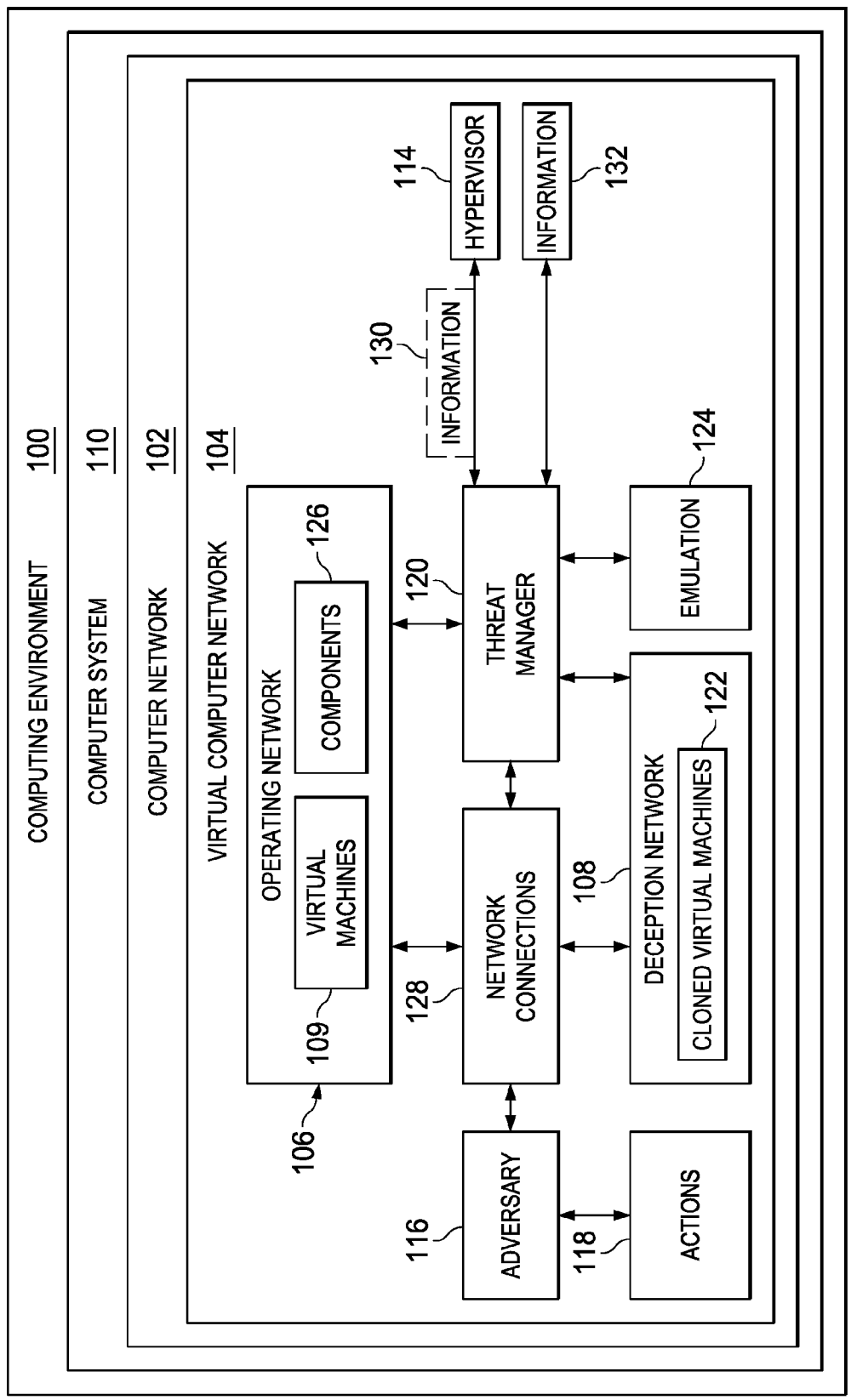
FIG. 1 is an illustration of a block diagram of a computing environment in accordance with an illustrative embodiment.

With reference now to the figures and, in particular, with reference to FIG. 1, an illustration of a block diagram of a computing environment is depicted in accordance with an illustrative embodiment. In this example, computing environment 100 includes computer network 102. As depicted, computer network 102 is virtual computer network 104 and includes operating network 106 and deception network 108. These networks are virtual networks within virtual computer network 104.

Operating network 106 includes virtual machines 109. In the illustrative example, a virtual machine in virtual machines 109 is an emulation of a computer. In other words, the virtual machine behaves like the computer. For example, the virtual machine functions like a real computer including emulations of hardware, software, or some combination thereof. In the illustrative example, the virtual machine may emulate other devices, such as a router or access port.

As virtual computer network 104, computer network 102 runs on computer system 110. Computer system 110 is a hardware system and includes one or more data processing systems. When more than one data processing system is present, those data processing systems may be in communication with each other using a communications medium. The communications medium may be a network. The data processing systems may be selected from at least one of a computer, a server computer, a laptop computer, a work station, a tablet computer, or some other suitable data processing system.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

One or more of these data processing systems provide the hardware to run virtual machines 109 that emulate computers, other devices, or some combination thereof. Hypervisor 114 is software, firmware, hardware, or some combination thereof, and creates and runs virtual machines 109. Hypervisor 114 may also be referred to as a virtual machine monitor.

In the illustrative example, hypervisor 114 manages virtual machines 109. Hypervisor 114 runs in a kernel of an operating system of one or more of the data processing systems in computer system 110.

In this illustrative example, adversary 116 may access operating network 106. In this illustrative example, adversary 116 is a person, program, computer, or other entity that accesses computer network 102 without authorization. For example, adversary 116 may access a group of virtual machines 109 in operating network 106 in computer network 102 without authorization. As used herein, "a group of," when used with reference to items, means one or more items. For example, a group of virtual machines 109 is one or more of virtual machines 109.

Adversary 116 may perform actions 118 within operating network 106 through accessing the group of virtual machines 109. The access to one or more of virtual machines 109 and actions 118 is unauthorized. This type of unauthorized access may be referred to as a cyber attack.

In the illustrative example, threat manager 120 manages unauthorized access by adversary 116. As depicted, threat manager 120 is located between hypervisor 114 and virtual machines 109.

Threat manager 120 may be implemented in software, hardware, firmware or a combination thereof. When software is used, the operations performed by threat manager 120 may be implemented in program code configured to run on hardware, such as a processor unit. When firmware is used, the operations performed by threat manager 120 may be implemented in program code and data and stored in persistent memory to run on a processor unit. When hardware is employed, the hardware may include circuits that operate to perform the operations in threat manager 120.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, threat manager 120 may detect the unauthorized access as well as take actions in response to the unauthorized access by adversary 116 in managing the unauthorized access. As depicted, threat manager 120 monitors operating network 106 with virtual machines 109 for unauthorized access by adversary 116. Threat manager 120 creates a copy of a group of the virtual machines 109 in operating network 106 in deception network 108 to form a group of cloned virtual machines 122 in deception network 108 when the group of the virtual machines 109 in operating network 106 is accessed by adversary 116.

In the illustrative example, threat manager 120 creates emulation 124 of components 126 from operating network 106 in deception network 108. As depicted, components 126 are accessible by the group of cloned virtual machines 122 as if the group of cloned virtual machines 122 was in operating network 106. This accessibility is from the perspective of adversary 116.

The group of cloned virtual machines 122 processes data in the same manner that the group of the virtual machines 109 processes data. The group of cloned virtual machines 122 emulates how the group of the virtual machines 109 would process data if the group of virtual machines 109 was located in deception network 108. In contrast, emulation 124 of components 126 simulates the processing of components 126. In emulating components 126, a duplicate of components 126 does not need to be used in emulating components. In emulating components 126, emulation 124 behaves in a manner that is consistent with how components 126 would work if they were located in deception network 108.

This behavior may be generated using processes, models, or other program codes that cause the emulated components to behave like the actual components. In one illustrative example, the emulation may even be a clone of a component, but the emulation does not need to be a clone.

Components 126 may be any thing or item that adversary 116 may access. This access may include reading, modifying, downloading, or other types of access. A component in components 126 may be selected from one of a domain controller, a file, a service, an encryption key, an email message, a document, an executable file, or some other item in the operating network that adversary 116 has accessed before being moved into deception network 108.

Threat manager 120 moves a group of network connections 128 for the group of virtual machines 109 in operating network 106 used by adversary 116 from the group of virtual machines 109 in operating network 106 to the group of cloned virtual machines 122 in deception network 108. As a result, adversary 116 may perform actions 118 in deception network 108 by accessing the group of cloned virtual machines 122 such that actions 118 have no effect on operating network 106.

These and other actions performed by threat manager 120 may be performed by monitoring and controlling information 130 that flows between hypervisor 114 and virtual machines 109. For example, hypervisor 114 may modify at least one of the information exchanged between hypervisor 114 and the group of cloned virtual machines 122 or the flow of information 130 between hypervisor 114 and the group of cloned virtual machines 122.

With the use of threat manager 120, adversary 116 is unaware that adversary 116 has been moved from operating network 106 to deception network 108 by threat manager 120. With adversary 116 performing actions 118 in deception network 108, threat manager 120 identifies information 132 about actions 118 taken by adversary 116 with respect to the group of cloned virtual machines 122 in deception network 108.

In the illustrative example, actions 118 of adversary 116 in deception network 108 are selected from at least one of a file transfer, a file deletion, a movement of a file, a modification of a file, or some other action that adversary 116 may take. In this manner, threat manager 120 enables protecting the group of virtual machines 109 from actions 118 performed by adversary 116.

Threat manager 120 may monitor activities of adversary 116 in each of the group of cloned virtual machines 122 that have been accessed by adversary 116. In the illustrative examples, an agent is not included in cloned virtual machines 122. The use of an agent increases the likelihood that adversary 116 will know that adversary 116 is not accessing operating network 106. Instead, threat manager performs introspection of virtual machines, such as virtual machines 109 in operating network 106 and cloned virtual machines 122 in deception network 108.

In one illustrative example, one or more technical solutions are present that overcome a technical problem with obtaining information about an adversary to mitigate the current attack or prevent future attacks on a computer network. As a result, one or more technical solutions may provide a technical effect of enabling increased protection of virtual machines in a computer network. For example, with threat manager 120 using cloned virtual machines 122 in deception network 108, threat manager 120 may generate impedances to adversary 116 that have results that are selected from at least one of obscuring the real target, devaluing information gathering, causing the adversary to waste time and resources, forcing the adversary to reveal capabilities, exposing the intent of the adversary, increasing difficulty of attack planning, limiting the scope of the attack, limiting the duration of the successful attack, or other desirable results.

In the illustrative example, computer system 110 operates as a special purpose computer system in which threat manager 120 in computer system 110 enables obtaining information about an adversary to mitigate the current attack on computer system 110 or prevent future attacks on computer system 110. In particular, threat manager 120 transforms computer system 110 into a special purpose computer system as compared to currently available general computer systems that do not have threat manager 120.

Figure 2:
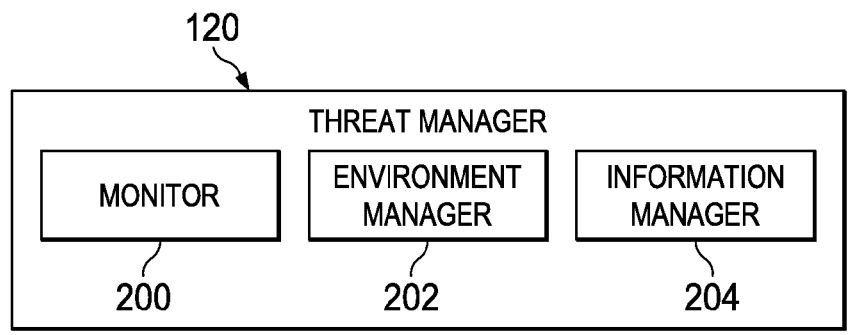
FIG. 2 is an illustration of a block diagram of components in a threat manager in accordance with an illustrative embodiment.

Turning next to FIG. 2, an illustration of a block diagram of components in a threat manager is depicted in accordance with an illustrative embodiment. In the illustrative examples, the same reference numeral may be used in more than one figure. This reuse of a reference numeral in different figures represents the same element in the different figures.

In this illustrative example, threat manager 120 includes a number of different components. These components are illustrated as functional components for threat manager 120. As depicted, threat manager 120 includes monitor 200, environment manager 202, and information manager 204.

In the illustrative example, monitor 200 monitors at least one of operating network 106 or deception network 108. For example, monitor 200 may monitor information 130 and how information 130 flows between at least one of virtual machines 109 or cloned virtual machines 122.

Additionally, monitor 200 may identify actions taken by adversary 116 within each of virtual machines 109 accessed by adversary 116. Further, monitor 200 also identifies actions taken by adversary 116 after each of the virtual machines accessed by adversary 116 has been cloned and network connections 128 to adversary 116 have been moved over the group of cloned virtual machines 122.

Environment manager 202 creates a group of cloned virtual machines 122 from each of the virtual machines that has been accessed by adversary 116. Additionally, environment manager 202 emulates components 126 that may be accessed by the group of cloned virtual machines 122. Further, environment manager 202 also may emulate components 126 that have been accessed by adversary 116 in operating network 106. As yet another example, environment manager 202 may age at least one of cloned virtual machines 122, components 126, and items that have been accessed by adversary 116. For example, the aging may make a cloned virtual machine in cloned virtual machines 122 appear to have been running for a period of time that is substantially the same as a corresponding virtual machine in virtual machines 109.

Information manager 204 identifies actions that may be taken to mitigate damage that may have been caused by adversary 116. Information manager 204 may operate while the attack is occurring in real time and perform the actions identified, or present the actions to an operator that may perform the actions that result in at least one of mitigating damage, gaining information about adversary 116, or mitigating the attack. These actions may include modifying information 130 in a manner such that information 130 is unusable by adversary 116. The modification may be made in a manner such that adversary 116 is unaware that the information has been modified by information manager 204. For example, information manager 204 may corrupt a file, an encryption key, or some other type of information such that the information is unusable by adversary 116.

In the illustrative example, information manager 204 may also identify actions to take after an attack has occurred. These actions may be used to prevent or mitigate damage from future attacks. The actions performed by information manager 204 may include at least one of modifying a file, modifying a message sent within deception network 108, redirecting access, corrupting encryption keys, or other suitable actions.

For example, if adversary 116 has seen the presence of an encryption key in operating network 106, the encryption key is an example of an item that may be duplicated within deception network 108. In one illustrative example, information manager 204 may corrupt the encryption key such that the encryption key is of no use to adversary 116 if adversary 116 decides to download the encryption key.

Figure 3:
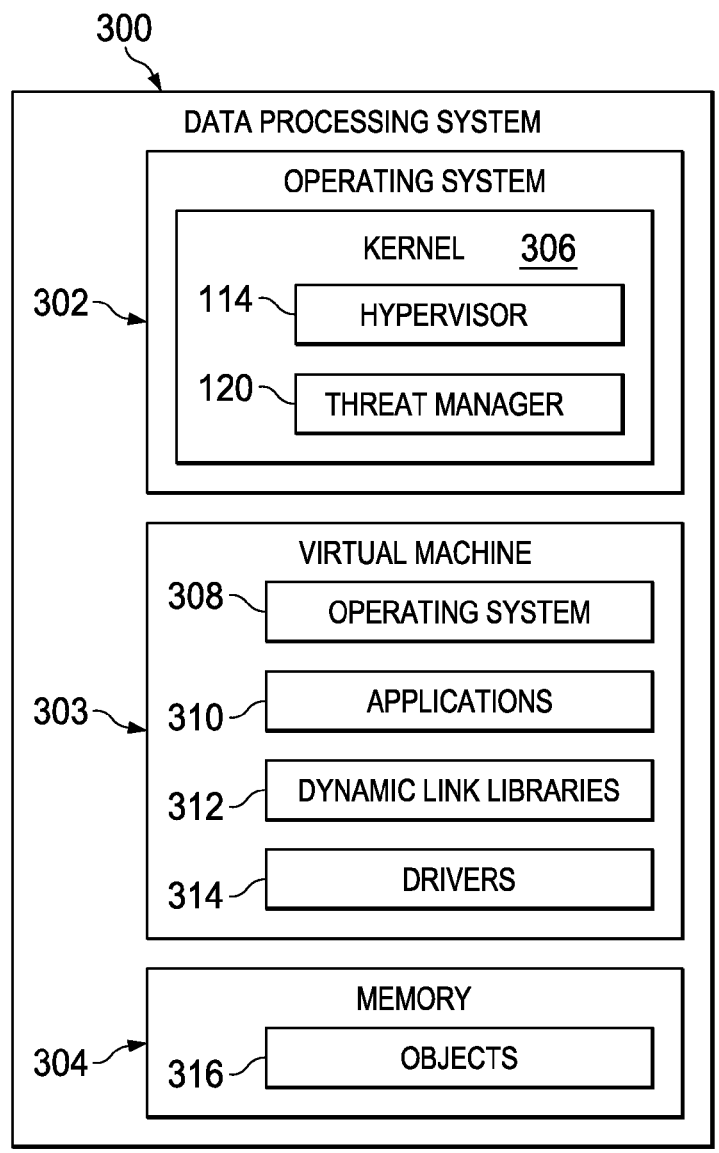
FIG. 3 is an illustration of a block diagram of a data processing system in accordance with an illustrative embodiment.

Turning now to FIG. 3, an illustration of a block diagram of a data processing system is depicted in accordance with an illustrative embodiment. In this illustration, data processing system 300 shows one example of an implementation of computer system 110 in FIG. 1.

In this illustration, an example of objects located in memory of data processing system 300 is shown. These objects are accessed by components of data processing system 300. Threat manager 120 monitors these objects to identify information about data processing system 300. The information identified from the monitoring of these objects may then be used by at least one of environment manager 202 or information manager 204 to mitigate actions 118 taken by adversary 116.

In this illustrative example, data processing system 300 includes operating system 302, virtual machine 303, and memory 304. Operating system 302 is executable code for performing tasks in data processing system 300. These tasks may be selected from at least one of running applications, displaying information on graphical user interfaces of display systems, printing files, configuring data processing system 300, or other suitable tasks.

As depicted, operating system 302 includes kernel 306. Kernel 306 is a portion of operating system 302 that manages access to hardware devices of data processing system 300. For example, these hardware devices may be selected from at least one of memory 304, communications units, processor units, storage devices, displays, or other suitable types of hardware devices. In this illustrative example, hypervisor 114 and threat manager 120 are implemented as components of kernel 306.

In this illustrative example, hypervisor 114 manages virtual machine 303. Hypervisor 114 manages access to hardware devices in data processing system 300 for virtual machine 303. Hypervisor 114 manages this access by creating and assigning virtual hardware devices to virtual machine 303 for virtual machine 303 to use when accessing the hardware devices in data processing system 300. For example, when virtual machine 303 uses a communications device, it does so through a virtual communications device created and assigned to virtual machine 303 by hypervisor 114.

Virtual machine 303 is an example of a virtual machine that is selected from at least one of virtual machines 109 or cloned virtual machines 122. As depicted, virtual machine 303 includes a number of different components. In this illustrative example, virtual machine 303 includes operating system 308, applications 310, dynamic link libraries 312, and drivers 314.

Operating system 308 is executable code for performing basic tasks in virtual machine 303. Applications 310 are programs that perform tasks in virtual machine 303. Applications 310 use operating system 308 to access the virtual hardware devices managed by hypervisor 114.

Dynamic link libraries 312 include at least one of data or executable code. Dynamic link libraries 312 are used by at least one of applications 310, operating system 308, or drivers 314.

Drivers 314 are executable codes that provide application programming interfaces for accessing hardware devices. For example, a video driver provides access to a display. As another example, a wireless device driver provides access to a wireless communication unit. As still another example, a file system driver provides access to a storage device.

As depicted, memory 304 includes objects 316. Objects are portions of memory 304 used by at least one of operating system 302, virtual machine 303, or other suitable types of components in data processing system 300. Objects 316 are selected from at least one of data or executable code.

In this illustrative example, a group of objects 316 for operating system 302 is only accessible by executable code running in kernel 306. In these illustrative examples, virtual machines 109 and cloned virtual machines 122 are not allowed to access the group of objects 316 for operating system 302. Threat manager 120 is allowed access to all objects in objects 316.

Threat manager 120 accesses objects 316 to obtain information 130 about adversary 116. Threat manager 120 also accesses objects 316 to mitigate current attacks or to prevent future attacks on computer network 102.

Figure 4:
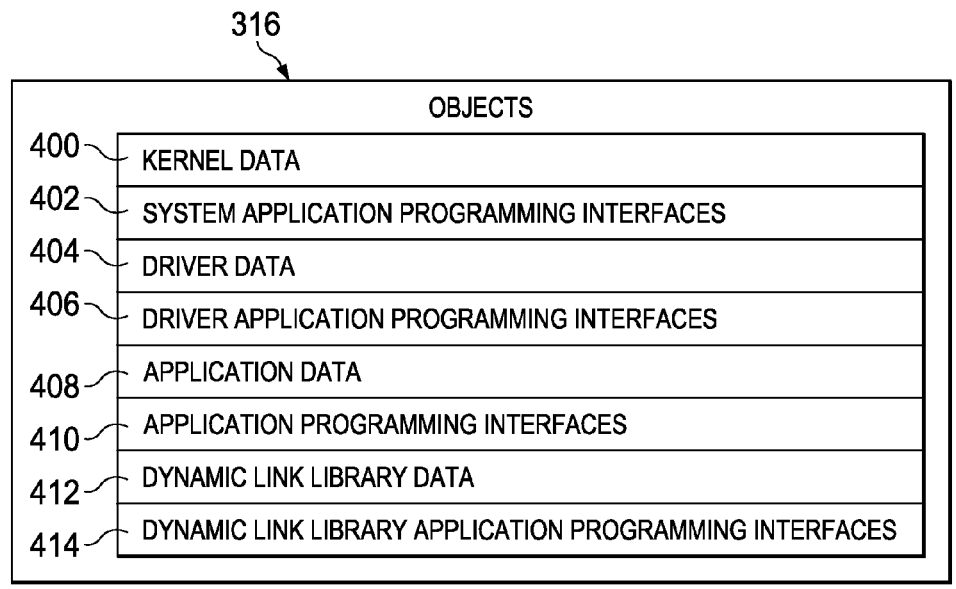
FIG. 4 is an illustration of a block diagram of objects in memory for an operating system in accordance with an illustrative embodiment.

With reference to FIG. 4, an illustration of a block diagram of objects in memory for an operating system is depicted in accordance with an illustrative embodiment. In this illustration, an example of objects 316 located in memory 304 in FIG. 3 is shown.

As depicted, objects 316 include kernel data 400, system application programming interfaces 402, driver data 404, driver application programming interfaces 406, application data 408, application programming interfaces 410, dynamic link library data 412, and dynamic link library application programming interfaces 414. Kernel data 400 is information accessed by components of kernel 306.

In this illustrative example, hypervisor 114 stores the state for virtual hardware devices in kernel data 400. Hypervisor 114 uses this state to manage virtual hardware devices for virtual machine 303. For example, the state used to manage a virtual communications unit for virtual machine 303 may include data about a network connection in network connections 128.

System application programming interfaces 402 are executable code for operating systems. System application programming interfaces 402 are used to perform actions 118. For example, programs may use system application programming interfaces 402 to access hardware devices. In the illustrative example, system application programming interfaces 402 are for accessing at least one of memory 304, communications units, storage devices, displays, or other suitable types of hardware devices.

Driver data 404 is information accessed by drivers 314. For example, a driver in drivers 314 may store a state in driver data 404 for a network connection in network connections 128. As still another example, a driver in drivers 314 for a storage device may store a listing of files in driver data 404. In this example, the listing of files is for files stored on the storage device.

Driver application programming interfaces 406 are executable code for drivers 314. Driver application programming interfaces 406 are used to perform actions 118. For example, programs may use driver application programming interfaces 406 to access hardware devices.

Application data 408 is data accessed by applications 310. Application programming interfaces 410 are executable code for applications 310. When an application in applications 310 is a bash shell application, the bash shell application includes an application programming interface in application programming interfaces 410 that receives requests to perform actions 118 from adversary 116.

Dynamic link library data 412 is data accessed by at least one of applications 310, drivers 314, operating system 308, or dynamic link library application programming interfaces 414. Dynamic link library application programming interfaces 414 are executable codes for dynamic link libraries 312. When a dynamic link library in dynamic link libraries 312 is a networking library, the networking library may include a networking interface in dynamic link library application programming interfaces 414 for accessing a network connection in network connections 128.

Figure 5:
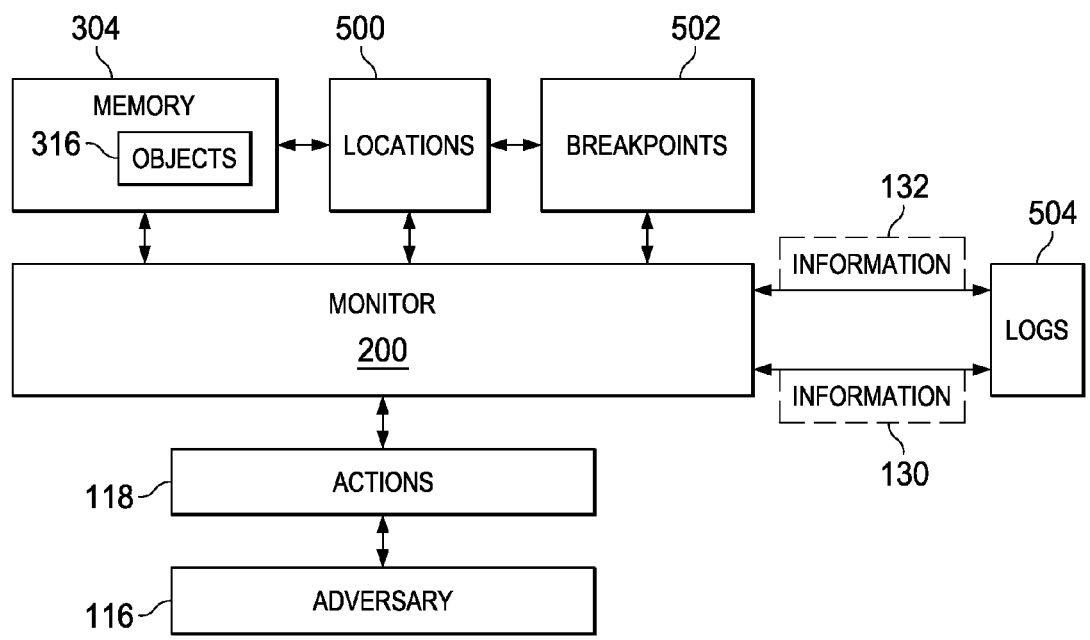
FIG. 5 is an illustration of a block diagram of data flow for monitoring information about a computer system in accordance with an illustrative embodiment.

With reference next to FIG. 5, an illustration of a block diagram of data flow for monitoring information about a computer system is depicted in accordance with an illustrative embodiment. In this figure, an example of data flow for monitoring accesses to objects 316 in memory 304 of data processing system 300 through monitor 200 is shown.

Monitor 200 identifies locations 500 of objects 316 in memory 304 by at least one of walking exports of portable executable (PE) files, disassembling certain code, or by identification of data in relation to other objects. For example, monitor 200 may identify a location in locations 500 for the beginning of memory 304 for an object in objects 316 by searching through memory 304 for a name for the object. In this illustrative example, when the location of the name at the beginning of memory 304 for the object is known, this location may also be used to identify locations 500 of other objects in objects 316 that are known to be offset from the location.

For example, the offset to a thread object from a process object may be found by using a kernel function that returns pointers to thread objects from process objects. The kernel function may be used by at least one of calling the kernel function or disassembling the kernel function. In this example, the kernel function may be found by walking the export table of the kernel portable executable (PE) file.

As another example, a location in memory 304 of a process directory-table for a process object may be found using a value in a cr3 register. In this example, the value in the cr3 register points to the location in memory 304 for a header of the process object. This header is the location in memory 304 where the location in memory 304 of the directory-table for the process object is found.

Monitor 200 sets breakpoints 502 at locations 500. Breakpoints 502 are selected from at least one of memory read breakpoints, memory write breakpoints, code execution breakpoints, or some other suitable type of breakpoints for locations 500 of objects 316 in memory 304. For example, monitor 200 may set breakpoints on a virtual machine exit handler of hypervisor 114 to track calls to the virtual machine exit handler. As another example, monitor 200 sets breakpoints on system application programming interfaces 402 of operating system 308 in virtual machine 303 to track calls to system application programming interfaces 402.

Monitor 200 identifies information 130 that flows between hypervisor 114 and virtual machines 109 when breakpoints 502 for hypervisor 114 are triggered. These breakpoints are triggered by accesses to memory 304 at locations 500 of objects 316 for hypervisor 114. Monitor 200 stores information 130 in logs 504.

Monitor 200 identifies information 132 about actions 118 taken by adversary 116 with respect to virtual machine 303 when breakpoints 502 for virtual machine 303 are triggered. These breakpoints are triggered by accesses to memory 304 at locations 500 of objects 316 for virtual machine 303. Monitor 200 stores information 132 in logs 504.

In this illustrative example, logs 504 are files located on storage devices. For example a log in logs 504 may be a file in a file system on a hard drive in computing environment 100. In this illustrative example, each log in logs 504 is selected for at least one of information 130 or information 132.

Figure 6:
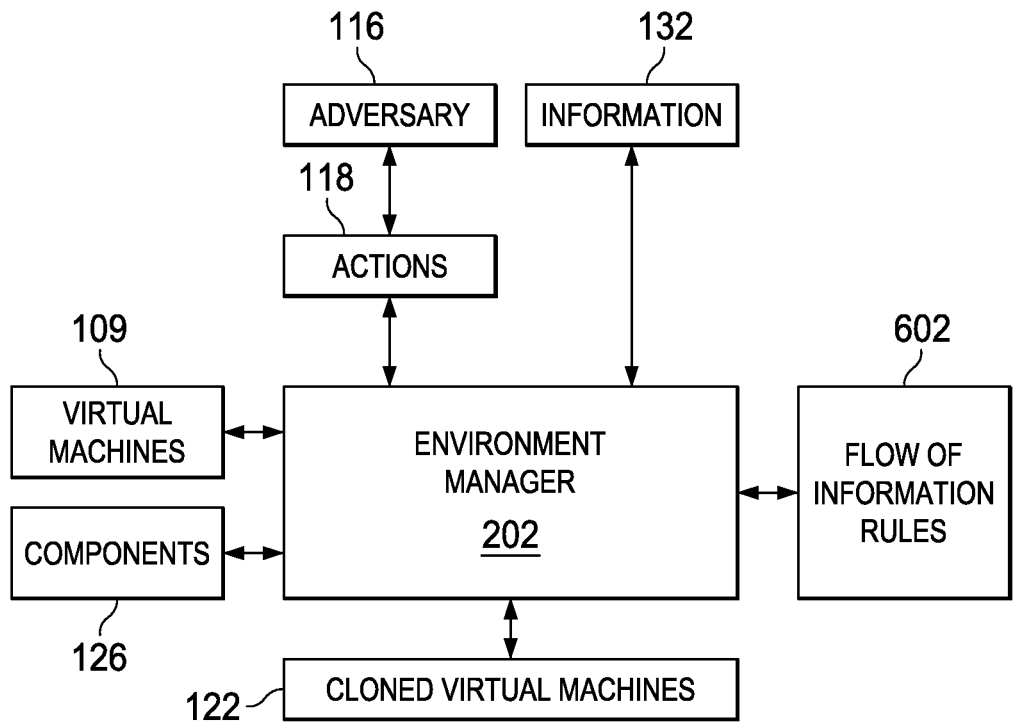
FIG. 6 is an illustration of a block diagram of data flow for managing virtual machines in accordance with an illustrative embodiment.

With reference now to FIG. 6, an illustration of a block diagram of data flow for managing virtual machines is depicted in accordance with an illustrative embodiment. In this illustration, an example of data flow for managing virtual machines through environment manager 202 is shown.

In this illustrative example, information 132 about actions 118 taken by adversary 116 may be identified as an attack by an analyst. Additionally, environment manager 202 may also identify the attack based on a comparison of information 132 to prior attacks identified by the analyst.

As depicted, environment manager 202 migrates a group of virtual machines 109 used in the attack from operating network 106 to deception network 108. Environment manager 202 migrates the group of virtual machines 109 to mitigate damage to operating network 106 by the attack.

In this illustrative example, environment manager 202 identifies a group of network connections 128 for the group of virtual machines 109. Environment manager 202 also identifies flow of information rules 602 for network connections 128. Flow of information rules 602 specifies routing information for the group of network connections 128.

Environment manager 202 creates a group of cloned virtual machines 122 for the group of virtual machines 109. Environment manager 202 uses flow of information rules 602 to configure the group of network connections 128 to use the group of cloned virtual machines 122.

Thus, the group of virtual machines 109 are migrated to the group of cloned virtual machines 122 in deception network 108. Additionally, network traffic for adversary 116 is routed to the group of cloned virtual machines 122 in deception network 108 while maintaining all network connections 128 for adversary 116. In other words, the group of network connections 128 are moved from connections in operating network 106 to connections in deception network 108 without an interruption to the group of network connections 128 used by adversary 116.

Figure 7:
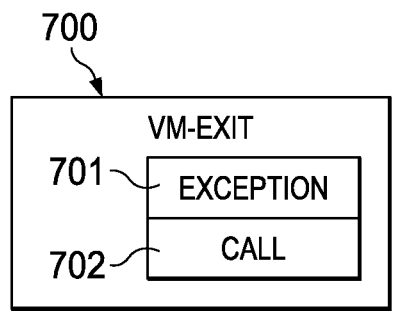
FIG. 7 is an illustration of a block diagram of a vm-exit in accordance with an illustrative embodiment.

Turning to FIG. 7, an illustration of a block diagram of a vm-exit is depicted in accordance with an illustrative embodiment. In this illustration, examples for types of vm-exit 700 for hypervisor 114 are shown.

As depicted, vm-exit 700 is a source of information from a virtual machine in virtual machines 109. In this illustrative example, vm-exit 700 is the result of at least one of exception 701, call 702, or other some other suitable type of vm-exit triggering activity in the virtual machine.

In these illustrative examples, vm-exit 700 is at least one of a naturally occurring result of virtual machine execution or forced by monitor 200 to gather information 130. For example, monitor 200 may receive exception 701 from vm-exit 700. Monitor 200 may then turn over control to environment manager 202 for further processing using flow of information 602.

For example, monitor 200 may identify a process as a malicious process by observing calls to system application programming interfaces 402 and the names of files being executed through these calls. When the malicious process is identified, an alert is sent to threat manager 120. Threat manager 120 then makes a determination on how to proceed with mitigating the threat posed by the malicious process. For example, threat manager 120 may select an action from at least one of modifying information on the virtual machine, stopping execution of the malicious process, or allowing the execution to continue and then modifying network traffic leaving the virtual machine to mitigate damage that would otherwise be caused by the information leaving the virtual machine through the network traffic.

Call 702 is an invoking of an application programming interface in system application programming interfaces 402 for hypervisor 114. Environment manager 202 catches call 702. Environment manager 202 processes call 702 using flow of information 602. For example, when call 702 is to an application programming interface in hypervisor 114 for accessing a virtual device, environment manager provides the access to an emulation of the virtual device using flow of information 602.

Figure 8:
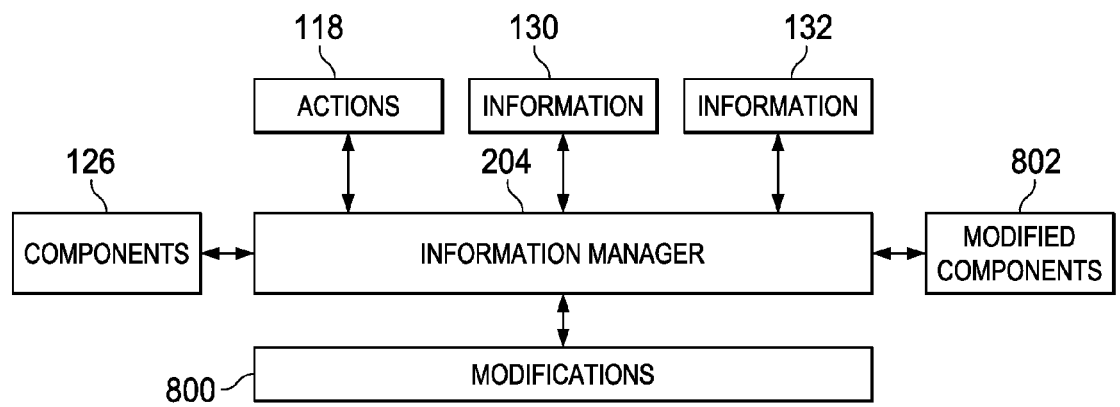
FIG. 8 is an illustration of a block diagram of data flow for managing information in accordance with an illustrative embodiment.

Turning next to FIG. 8, an illustration of a block diagram of data flow for managing information is depicted in accordance with an illustrative embodiment. In this illustration, an example of data flow for managing information to mitigate damage done by an attack by adversary 116 through information manager 204 is shown.

As depicted, information manager 204 identifies actions 118 that access components 126 through at least one of information 130 or information 132. Information manager 204 identifies modifications 800 to components 126. Modifications 800 are changes that mitigate damage by an attack from adversary 116. These changes are selected from at least one of a change to files in storage devices, changes to data in memory, changes to a flow of information, or some other suitable type of change that mitigates damage done by the attack.

In this illustrative example, information manager 204 applies modifications 800 to components 126 to form modified components 802. When actions 118 access components 126 through at least one of information 130 or information 132, information manager 204 provides modified components 802 instead of components 126.

When a modification in modifications 800 is made to a file, the modification may be selected from at least one of stripping content in the file, replacement of the file, or some other suitable type of change to the file to mitigate access to the contents of the file. Modifications 800 to files located on computer system 110 are selected from at least one of making modifications to files, deleting files, or adding files. When a modification in modifications 800 is made to network traffic, the modification may corrupt the network traffic in a manner that prevents file reconstruction when a transmission of the file has completed.

Figure 9:
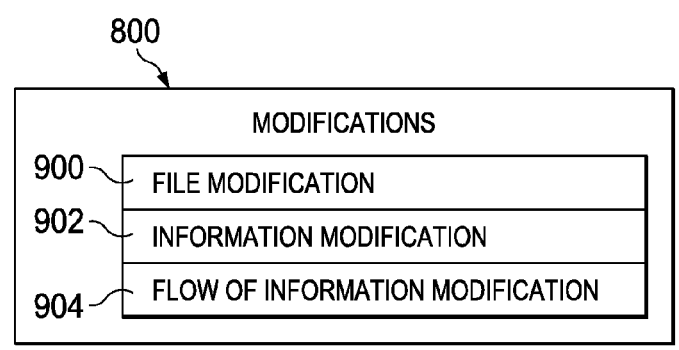
FIG. 9 is an illustration of a block diagram of modifications in accordance with an illustrative embodiment.

With reference to FIG. 9, an illustration of a block diagram of modifications is depicted in accordance with an illustrative embodiment. In this illustration, examples for types of modifications 800 are shown.

In this illustrative example, modifications 800 are selected from at least one of file modification 900, information modification 902, flow of information modification 904, or some other suitable type of modification for computing environment 100. File modification 900 is a change to at least one of a listing of files, a file attribute, or content of a file.

As depicted, when file modification 900 is to the listing of files, file modification 900 is selected from at least one of removing files or adding files to the listing of files. For example, information manager 204 may remove a portion of a listing of files to mitigate access to the portion.

File attributes are values that describe aspects of files. These file attributes are selected from at least one of cyclic redundancy check values, file names, file sizes, or other suitable types of file attributes.

In this illustrative example, when file modification 900 is to the content of a file, file modification 900 is selected from at least one of removing a portion of the file, adding information to the file to form a new portion, encrypting a portion of the file, corrupting a portion of the file, or some other suitable type of change. As depicted, file modification 900 is for at least one of mitigating damage, gaining information about adversary 116, or preventing an attack.

As depicted, information modification 902 is a change to data in memory 304. In this illustrative example, the data changed is located in at least one of kernel data 400, driver data 404, application data 408, dynamic link library data 412, or other types of data in memory 304. This change to data is selected from at least one of removing the data, adding information to the data to form a new portion for the data, encrypting the data, corrupting the data or some other suitable type of change to the data for at least one of mitigating damage, gaining information about adversary 116, or preventing an attack. In this illustrative example, information modification 902 may include modifying a system time of a virtual machine to make it appear as if the virtual machine is older.

In this illustrative example, flow of information modification 904 is a change to how information flows between virtual machines 109 and external entities or cloned virtual machines 122. For example, when a virtual machine in virtual machines 109 is migrated to a cloned virtual machine in cloned virtual machines 122 in deception network 108, static flow rules are installed in virtual computer network 104 to route network traffic to the cloned virtual machine. Thus, malicious network traffic is routed away from operating network 106.

The illustration of computing environment 100 and the different components in FIGS. 1-9 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, threat manager 120 may be part of hypervisor 114 even though threat manager 120 is shown as a separate block. In another illustrative example, deception network 108 may emulate all of operating network 106. In yet another illustrative example, one or more of virtual machines 109 may be emulated as cloned virtual machines 122 prior to detecting an unauthorized access by adversary 116. The selection of which ones of virtual machines 109 are cloned ahead of time may be based on the vulnerability of particular ones of virtual machines 109 or based on some other selection factor.

As another example, data processing system 300 may also include other components selected from at least one of central processor units, networking units, storage devices, additional memory, or other suitable types of components. For example, when data processing system 300 includes storage devices, threat manager 120 may clone a database in one of the storage devices to form a cloned database in another storage device in data processing system 300. When threat manager 120 clones the database, threat manager 120 may also modify information in the cloned database. In this example, a user of data processing system 300 that is not adversary 116 may use the database in data processing system 300 while threat manager 120 is simultaneously mitigating actions 118 of adversary 116 by limiting actions 118 to use of the modified version of the database.

Figure 10:
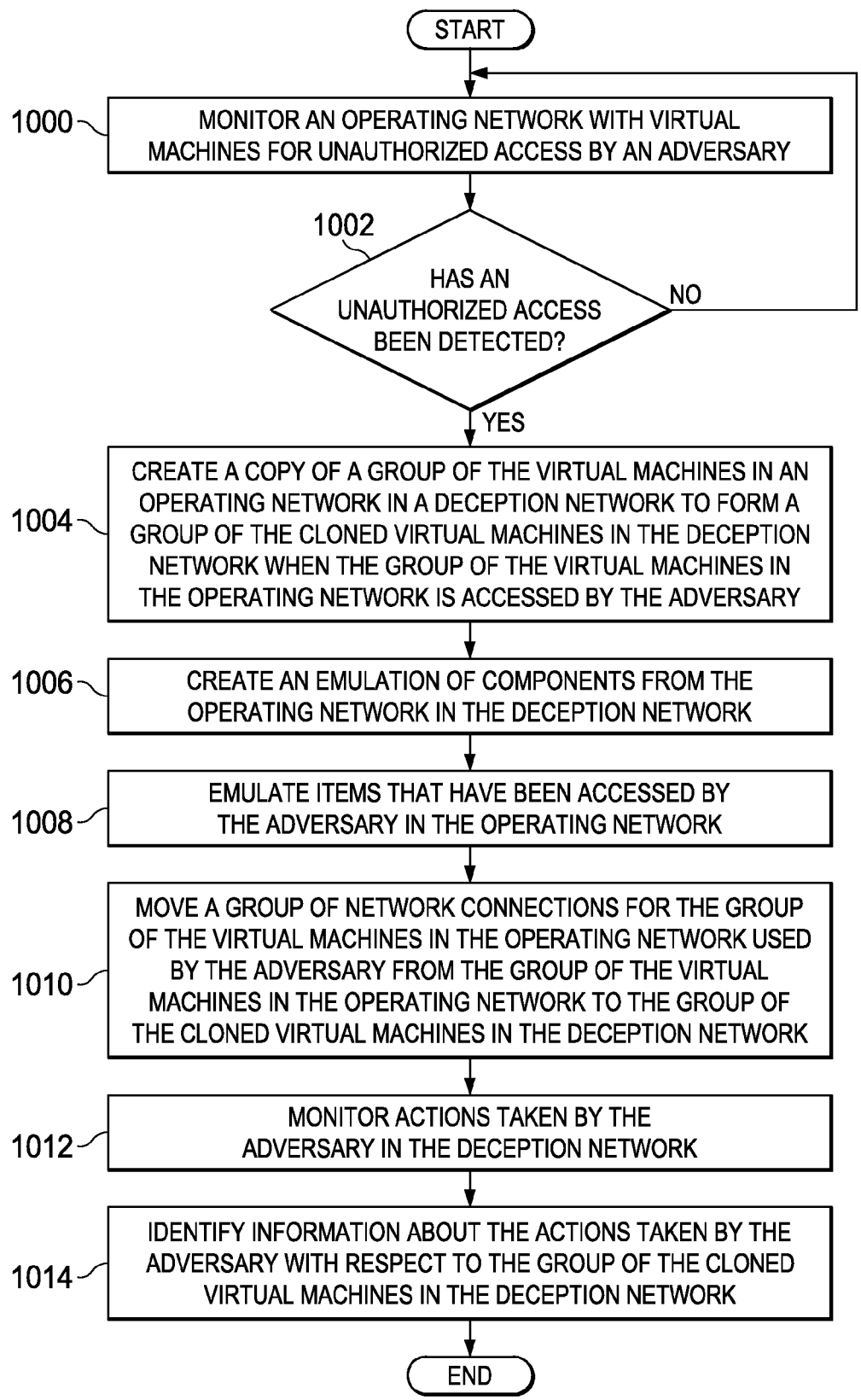
FIG. 10 is an illustration of a flowchart of a process for protecting a virtual network in accordance with an illustrative embodiment.

Turning next to FIG. 10, an illustration of a flowchart of a process for protecting a virtual network is depicted in accordance with an illustrative embodiment. The process illustrated in FIG. 10 may be implemented in computer network 102 and, in particular, in threat manager 120.

The process begins by monitoring an operating network with the virtual machines for unauthorized access by an adversary (step 1000). A determination is made as to whether an unauthorized access has been detected (step 1002). If an unauthorized access has not been detected, the process returns to step 1000.

Otherwise, the process creates a copy of a group of the virtual machines in an operating network in a deception network to form a group of cloned virtual machines in the deception network when the group of the virtual machines in the operating network is accessed by an adversary (step 1004). The process creates an emulation of components from the operating network in the deception network (step 1006). The components are accessible by the group of the cloned virtual machines as if the group of the cloned virtual machines were in the operating network. The components in step 1006 may already be located in the deception network before step 1004.

The process emulates items that have been accessed by the adversary in the operating network (step 1008). An item may be selected from one of a file, a service, or some other item in the operating network that the adversary has accessed before being moved into the deception network.

The process moves a group of network connections for the group of virtual machines in the operating network used by the adversary from the group of virtual machines in the operating network to the group of cloned virtual machines in the deception network (step 1010). The process monitors actions taken by the adversary in the deception network (step 1012). The process identifies information about actions taken by the adversary with respect to the group of cloned virtual machines in the deception network (step 1014), with the process terminating thereafter. The process enables protecting the group of virtual machines from actions performed by the adversary. With the process in FIG. 10, actions may be taken to perform at least one of mitigating the current attack or preventing future attacks on the computer network.

Figure 11:
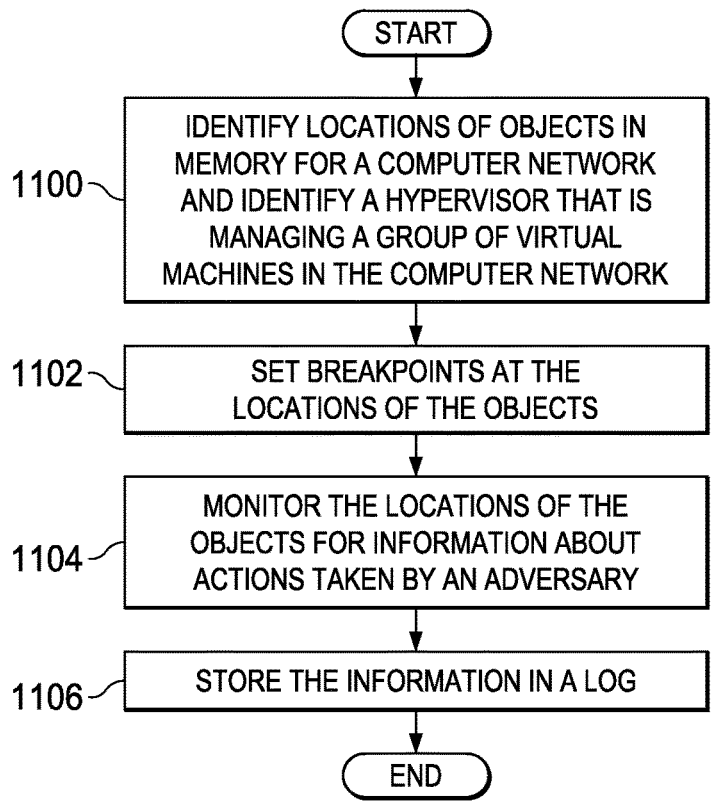
FIG. 11 is an illustration of a flowchart of a process for monitoring a virtual network in accordance with an illustrative embodiment.

Turning now to FIG. 11, an illustration of a flowchart of a process for monitoring a virtual network is depicted in accordance with an illustrative embodiment. The process in this illustration is one example of an implementation for step 1000 in FIG. 10. The process illustrated in FIG. 11 may be implemented in computer network 102 in FIG. 1. In particular, the process may be implemented in monitor 200 in FIG. 5.

The process begins by identifying locations of objects in memory for a computer network and identifies a hypervisor that is managing a group of virtual machines in the computer network (step 1100). The computer network in step 1100 is an example of computer network 102 in FIG. 1. The group of virtual machines is selected from at least one of the group of virtual machines 109 or the group of cloned virtual machines 122 in FIG. 1. The memory is an example of memory 304 in FIG. 3 and FIG. 5. The objects are an example of objects 316 in memory 304 in FIGS. 3-5.

The process sets breakpoints at the locations of the objects (step 1102). The breakpoints in step 1102 are examples of breakpoints 502 in FIG. 5.

The process monitors the locations of the objects for information about actions taken by an adversary (step 1104). The adversary in step 1104 is adversary 116 in FIG. 1. The actions are an example of actions 118 in FIG. 1. In monitoring the locations of the objects for information about the actions taken by the adversary, the process monitors the network for unauthorized access by the adversary. The information is an example of information 130 in FIG. 1 and FIG. 5.

The process then stores the information in a log (step 1106) with the process terminating thereafter. The log in step 1106 is an example of logs 504 in FIG. 5.

Figure 12:
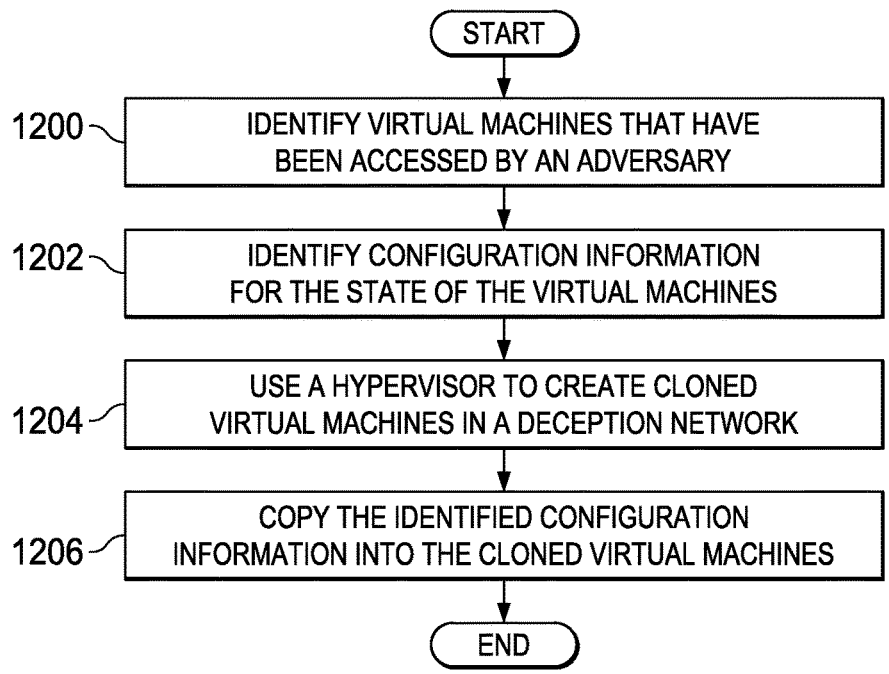
FIG. 12 is an illustration of a flowchart of a process for managing a virtual network in accordance with an illustrative embodiment.

Turning now to FIG. 12, an illustration of a flowchart of a process for managing a virtual network is depicted in accordance with an illustrative embodiment. The process in this illustration is one example of an implementation for steps 1004-1006 in FIG. 10. The process illustrated in FIG. 12 may be implemented in computer network 102 in FIG. 1. In particular, the process may be implemented in environment manager 202 in FIG. 6.

The process begins by first identifying virtual machines that have been accessed by an adversary (step 1200). The process next identifies configuration information for the state of the virtual machines (step 1202). The configuration information includes information for at least one of network interfaces, memory, central processing units, and virtual storage devices.

The process uses a hypervisor to create cloned virtual machines in a deception network (step 1204). The process then copies the identified configuration information into the cloned virtual machines (step 1206) with the process terminating thereafter. Thus, when the cloned virtual machines are executed, the state of the identified virtual machines is resumed in the cloned virtual machines.

Figure 13:
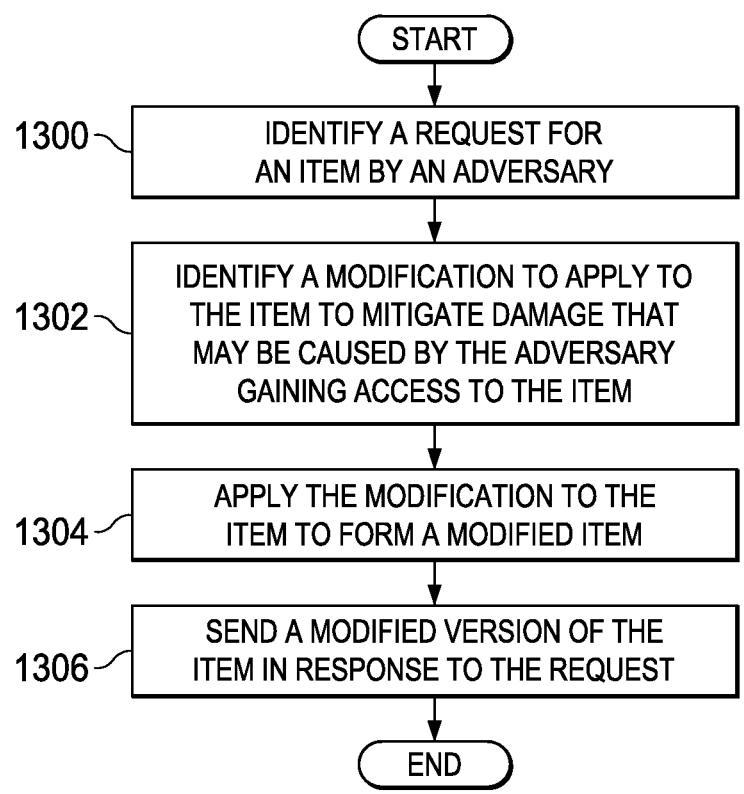
FIG. 13 is an illustration of a flowchart of a process for managing information in a virtual network in accordance with an illustrative embodiment.

Turning now to FIG. 13, an illustration of a flowchart of a process for managing information in a virtual network is depicted in accordance with an illustrative embodiment. The process in this illustration is one example of an implementation for step 1008 in FIG. 10. The process illustrated in FIG. 13 may be implemented in computer network 102 in FIG. 1. In particular, the process may be implemented in information manager 204 in FIG. 8.

The process begins by identifying a request for an item by an adversary (step 1300). The process next identifies a modification to apply to the item to mitigate damage that may be caused by the adversary gaining access to the item (step 1302). The process applies the modification to the item to form a modified item (step 1304). The process then sends the modified version of the item in response to the request (step 1306) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
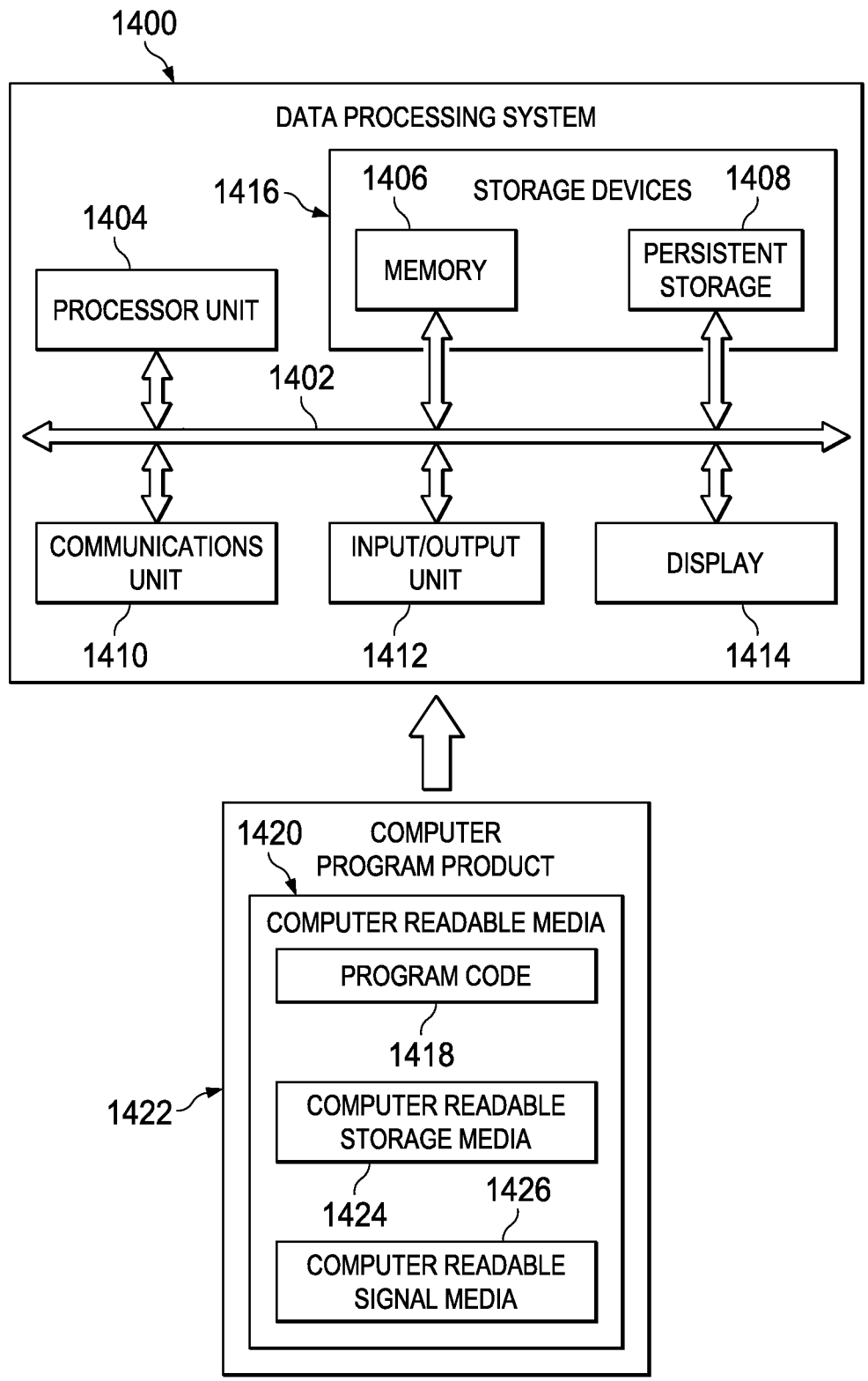
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement computer system 110 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418. Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

Thus, the illustrative embodiments provide a method and apparatus for protecting a network in which virtual machines are present. The illustrative embodiments provide a method and apparatus that generate impedances to the adversary that have results that are selected from at least one of obscuring the real target, devaluing information gathering, causing the adversary to waste time and resources, forcing the adversary to reveal capabilities, exposing the intent of the adversary, increasing difficulty of attack planning, limiting the scope of the attack, limiting the duration of the successful attack, or other desirable results.

As depicted, the use of a deception network with a threat manager enables the detection and identification of anomalous access and intrusions from adversaries. Also, in the illustrative example, the threat manager may adjust to the dynamic nature of adversaries by live migrating the adversaries into a deception network. In an illustrative example, the threat manager allows discovering and reacting to the attacks by adversaries in a methodical and proactive manner.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for protecting virtual machines, the computer-implemented method comprising:
    creating a copy of a group of the virtual machines in an operating network in a deception network to form a group of cloned virtual machines in the deception network in response to determining that the group of the virtual machines in the operating network is accessed by an adversary;
    determining, in response to determining that the group of the virtual machines in the operating network is accessed by an adversary, at least one component from the operating network that the adversary has accessed;
    creating, in response to determining that the adversary has accessed at least one component from the operating network, an emulation of the at least one component in the deception network; and
    moving a group of network connections for the group of the virtual machines in the operating network used by the adversary from the group of the virtual machines in the operating network to the group of the cloned virtual machines in the deception network, thereby enabling protection of the group of the virtual machines from actions performed by the adversary, wherein the cloned virtual machine is shown to the adversary to have been running for the same period of time as that of a corresponding virtual machine in the operating network from which the cloned virtual machine was cloned.

2. The computer-implemented method of claim 1 further comprising:

identifying information about the actions taken by the adversary with respect to the group of the cloned virtual machines in the deception network.

3. The computer-implemented method of claim 1 further comprising:
monitoring the operating network with the virtual machines for unauthorized access by the adversary.

4. The computer-implemented method of claim 3, wherein the actions of the adversary in the deception network are selected from at least one of a file transfer, a file deletion, a movement of a file, or a modification of the file.

5. The computer-implemented method of claim 1, wherein the virtual machines are managed by a hypervisor running in a kernel of an operating system.

6. The computer-implemented method of claim 1, wherein the emulation of the at least one component is created by a threat manager, and wherein the threat manager modifies at least one of information exchanged between a hypervisor and the group of the cloned virtual machines, or a flow of the information between the hypervisor and the group of the cloned virtual machines.

7. The computer-implemented method of claim 6, wherein the flow of the information between the hypervisor and the group of the cloned virtual machines includes an exception generated by the group of the cloned virtual machines, and wherein the threat manager handles the exception to simulate the flow of the information between the hypervisor and the group of the cloned virtual machines in the deception network as if the adversary was performing activities in the group of the virtual machines in the operating network.

8. The computer-implemented method of claim 1, wherein the emulation of the at least one component identifies a request for a state of a cloned virtual machine in the group of the cloned virtual machines in the deception network and changes the state of the cloned virtual machine for a response to the request such that the state is selected from at least one of the cloned virtual machine being shown to the adversary to be located in the operating network, or the cloned virtual machine being shown to the adversary to be using memory used by the corresponding virtual machine.

9. The computer-implemented method of claim 1, wherein the group of network connections is moved without an interruption to the group of network connections used by the adversary.

10. An apparatus comprising:
a threat manager in a computer system that:
creates a copy of a group of virtual machines in an operating network in a deception network to form a group of cloned virtual machines in the deception network in response to determining that the group of the virtual machines in the operating network is accessed by an adversary;
determines at least one component from the operating network that the adversary has accessed;
creates an emulation of the at least one component in the deception network; and
moves a group of network connections for the group of the virtual machines in the operating network used by the adversary from the group of the virtual machines in the operating network to the group of the cloned virtual machines in the deception network, thereby enabling protection of the group of the virtual machines from actions performed by the adversary, wherein the cloned virtual machine is shown to the adversary to have been running for the same period of time as that of a corresponding virtual machine in the operating network from which the cloned virtual machine was cloned.

11. The apparatus of claim 10, wherein the threat manager identifies information about the actions taken by the adversary with respect to the group of the cloned virtual machines in the deception network.

12. The apparatus of claim 10, wherein the threat manager further comprises: monitoring the operating network with the virtual machines for unauthorized access by the adversary.

13. The apparatus of claim 12, wherein the actions of the adversary in the deception network are selected from at least one of a file transfer, a file deletion, a movement of a file, or a modification of the file.

14. The apparatus of claim 10, wherein the virtual machines are managed by a hypervisor running in a kernel of an operating system.

15. The apparatus of claim 10, wherein the threat manager modifies at least one of information exchanged between a hypervisor and the group of the cloned virtual machines, or a flow of the information between the hypervisor and the group of the cloned virtual machines.

16. The apparatus of claim 15, wherein the flow of the information between the hypervisor and the group of the cloned virtual machines includes an exception generated by the group of the cloned virtual machines, and wherein the threat manager handles the exceptions to simulate the flow of the information between the hypervisor and the group of the cloned virtual machines in the deception network as if the adversary was performing activities in the group of the virtual machines in the operating network.

17. The apparatus of claim 10, wherein the threat manager identifies a request for a state of a cloned virtual machine in the group of the cloned virtual machines in the deception network and changes the state of the cloned virtual machine for a response to the request such that the state is selected from at least one of the cloned virtual machine being shown to the adversary to be located in the operating network, or the cloned virtual machine being shown to the adversary to be using memory used by the corresponding virtual machine.

18. The apparatus of claim 10, wherein the group of network connections is moved without an interruption to the group of network connections used by the adversary.

19. A computer program product for protecting virtual machines, the computer program product being on a non-transitory computer readable storage media comprising program code, which when processed by a processor:
creates a copy of a group of the virtual machines in an operating network in a deception network to form a group of cloned virtual machines in the deception network in response to determining that the group of the virtual machines in the operating network is accessed by an adversary;
determines at least one component from the operating network that the adversary has accessed;
creates, in response to determining that the adversary has accessed at least one component from the operating network, an emulation of the at least one component in the deception network; and
moves a group of network connections for the group of the virtual machines in the operating network used by the adversary from the group of the virtual machines in the operating network to the group of the cloned virtual machines in the deception network, thereby enabling protection of the group of the virtual machines from actions performed by the adversary, wherein the cloned virtual machine is shown to the adversary to have been running for the same period of time as that of a corresponding virtual machine in the operating network from which the cloned virtual machine was cloned.

20. The computer program product of claim 19, wherein the program code is further processed by the processor to identify information about the actions taken by the adversary with respect to the group of the cloned virtual machines in the deception network.

21. The computer program product of claim 19, wherein the program code is further processed by the processor to monitor the operating network with the virtual machines for unauthorized access by the adversary.

22. The computer program product of claim 19, wherein the emulation of the at least one component is created by a threat manager that modifies at least one of information exchanged between a hypervisor and the group of the cloned virtual machines, or a flow of the information between the hypervisor and the group of the cloned virtual machines.

23. The computer program product of claim 19, wherein the virtual machines are managed by a hypervisor running in a kernel of an operating system and a flow of information between the hypervisor and the virtual machines includes exceptions generated by the virtual machines, and wherein a threat manager handles the exceptions to simulate the flow of the information between the hypervisor and the group of the cloned virtual machines in the deception network as if the adversary was performing activities in the group of the virtual machines in the operating network.

24. The computer program product of claim 19, wherein the emulation of the at least one component identifies a request for a state of a cloned virtual machine in the group of the cloned virtual machines in the deception network and changes the state of the cloned virtual machine for a response to the request such that the state is selected from at least one of the cloned virtual machine being shown to the adversary to be located in the operating network, or the cloned virtual machine being shown to the adversary to be using memory used by the corresponding virtual machine.

25. The computer program product of claim 19, wherein the group of network connections is moved without an interruption to the group of network connections used by the adversary.

* * * * *